Dec. 30, 1930.  B. A. LINDERMAN  1,786,438
FLUID PRESSURE BRAKE
Filed Dec. 1, 1924   7 Sheets-Sheet 1

Dec. 30, 1930. B. A. LINDERMAN 1,786,438
FLUID PRESSURE BRAKE
Filed Dec. 1, 1924   7 Sheets-Sheet 4

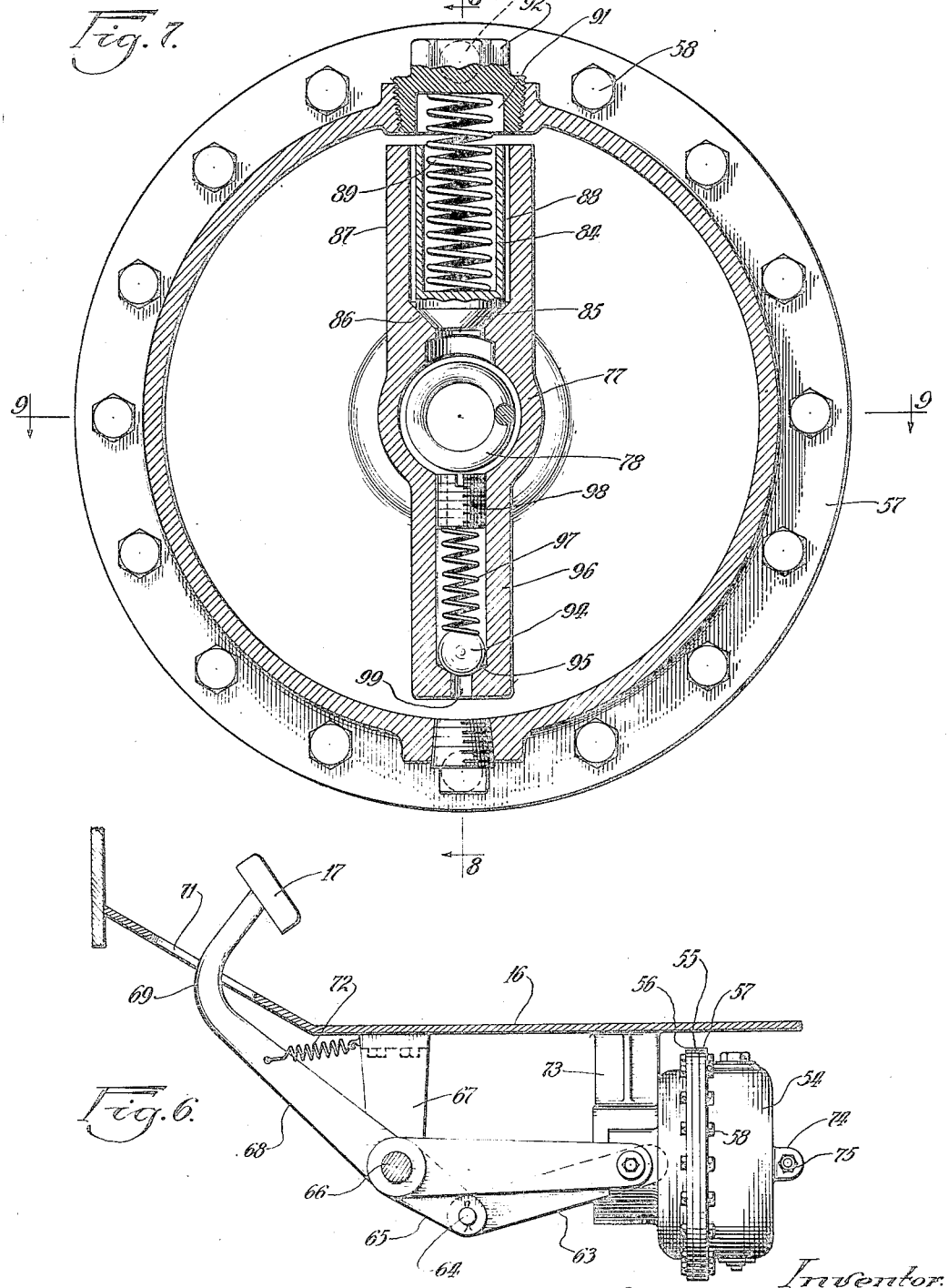

Dec. 30, 1930.   B. A. LINDERMAN   1,786,438
FLUID PRESSURE BRAKE
Filed Dec. 1, 1924   7 Sheets-Sheet 6

Inventor:
Bert A. Linderman
By Munday, Clarke & Carpenter
Attys

Patented Dec. 30, 1930

1,786,438

UNITED STATES PATENT OFFICE

BERT A. LINDERMAN, OF NEW YORK, N. Y., ASSIGNOR TO LINDERMAN & COMPANY, OF WILMINGTON, DELAWARE, A CORPORATION OF DELAWARE

FLUID-PRESSURE BRAKE

Application filed December 1, 1924. Serial No. 753,085.

My invention relates to fluid pressure braking mechanism for automobiles and has for a primary object the provision of a braking system which is truly hydraulic, as contradistinguished from the usual hydro-mechanical systems, the hydraulic pressure in the present instance being applied directly to the movable brake elements rather than to a member, such as a piston, connected by a series of mechanical elements to the brake itself, as is usual in so-called hydraulic brake systems.

Certain features of the invention, however, are of general application and a further very important object is the provision of a self-contained fluid pressure braking system automatically conformable to changing conditions resulting from wear of the braking elements, so that such wear is compensated for without adjustment of any of the parts, provision being also made to substantially avoid any leakage, or other cause for addition of fluid, with the result that, in addition to being non-adjustable, the system may be hermetically sealed and will require practically no attention whatever after it is installed.

A very important feature of the invention is that the above object is attained with a uniform predetermined stroke of the foot pedal, or brake applying lever, without adjustment or change of the fulcrum point of said lever, a proper leverage ratio being thereby maintained at all times and under all conditions of service.

As indicated above, the braking system of my present invention involves the principle disclosed in my prior application, Serial No. 725,786, filed July 14, 1924, namely that the brakes are applied by fluid pressure acting directly upon the movable braking elements without the interposition of any links or levers, or other mechanical devices, the system being, therefore, truly hydraulic, instead of hydro-mechanical. The invention is, therefore, of a wholly different character than in most prior patents relating to so-called fluid pressure braking systems and is further particularly characterized and separately classified by reason of the fact that the system is nonadjustable and hermetically sealed, as hereinbefore stated.

A highly important object of the invention is the provision, in a fluid pressure braking system, of a supply chamber and, in conjunction therewith, means for exhausting excess fluid from the operating volume into said chamber after a predetermined pressure at the brakes is attained, together with means for automatically supplying any deficiency in said operating volume which may occur due to changing conditions of the brakes.

Another important feature of the invention is the provisioin, in a fluid pressure braking system of this character, of measuring valves which insure at all times a sufficient volume of fluid at the brakes to properly apply them, regardless of wear upon the brake lining, such wear being automatically compensated for by the flow of additional fluid past floating pistons in said measuring valve. In this connection, provision is made for accurately controlling the withdrawal of fluid when the brakes are to be released, so that the brakes at the several wheels (the present system being particularly adapted for a four wheel braking system) will be simultaneously released and to like extent, in order to prevent skidding of the car, or other undesirable results of irregular releasing action at the different wheels.

As will be observed from the following description, the breaking system of the present invention has been designed having in view as one of it's objects the avoidance of any unnecessary mechansm, or parts which might tend to bind, or to become loose in action, thus further contributing to the accomplishment of the principal object of the invention, namely the provision of a non-adjustable, hermetically sealed breaking apparatus, capable of efficient performance throughout the life of the car to which it is applied, without alteration or attention.

Among the other objects of the invention may be mentioned the provision of means for throughly exhausting air from the system when it is first filled with liquid, and an arrangement of the brake segments which insures effective operation of the brake even though one or more of said segments should fail to function in the manner intended.

Numerous other objects and advantages of the invention will be apparent as it is better understood from the following description, which, taken in connection with the accompanying drawings, discloses a preferred embodiment thereof.

In the drawings, I have shown, for illustrative purposes only, a preferred form of my invention, in which, Figure 1 is a plan view, in outline, of an automobile chassis equipped with a breaking system in which my invention is embodied;

Fig. 6 is a view taken longitudinally through the floor of the car and showing in elevation the fluid compressor and the foot pedal for actuating the same;

Fig. 7 is a vertical sectional view, taken transversely of said compressor and showing the relief and check valves for controlling the pressure in the system;

Figure 1:
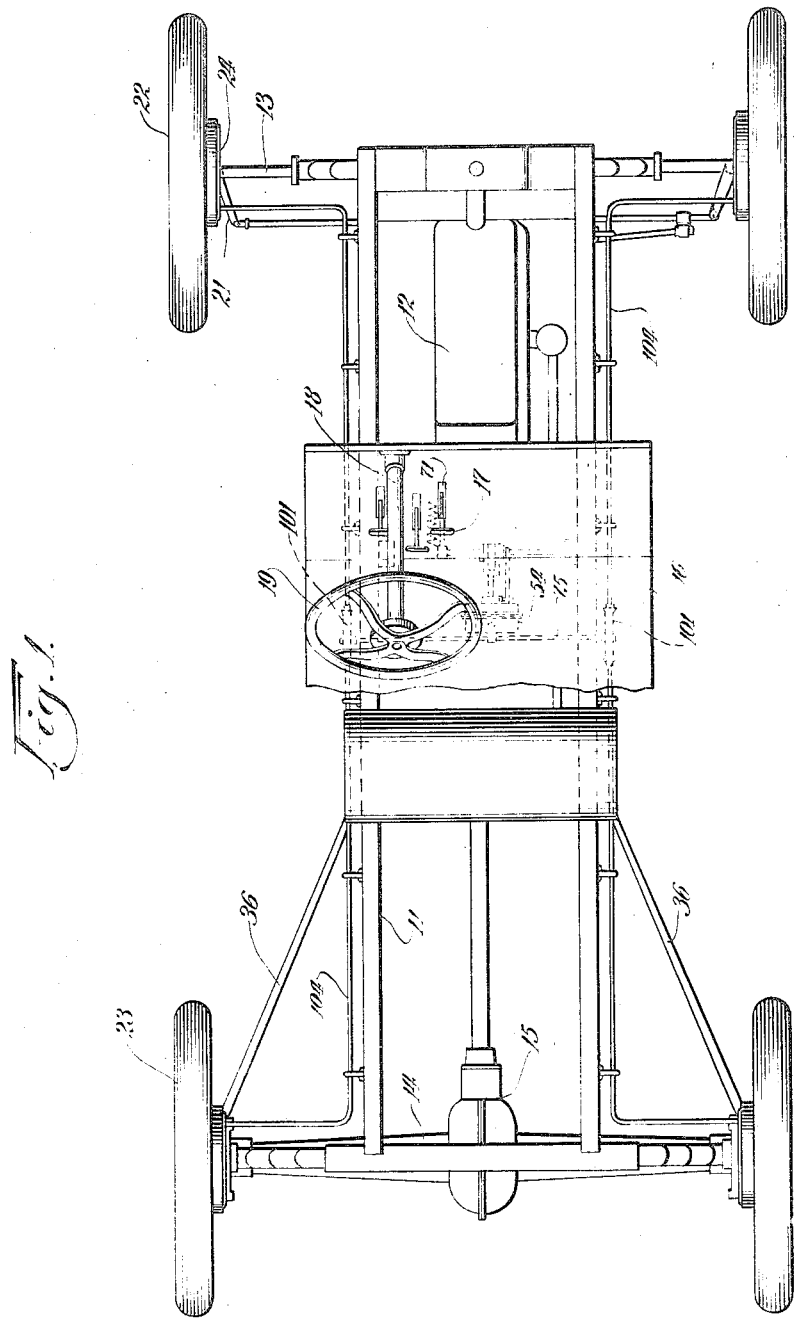

Upon said drawings, illustrating the best manner in which I have thus far contemplated applying the principles of my invention, the reference character 11 indicates the chassis frame, upon which is mounted an engine 12 and the other usual parts, including a front axle 13, a rear axle organization 14 and a transmission 15. Extending through the floor 16 of the car are the usual control parts, including a brake pedal 17, and steering post 18, the steering wheel 19 being connected in the usual manner to actuate steering arms 21 at the front wheels.

Figure 2:
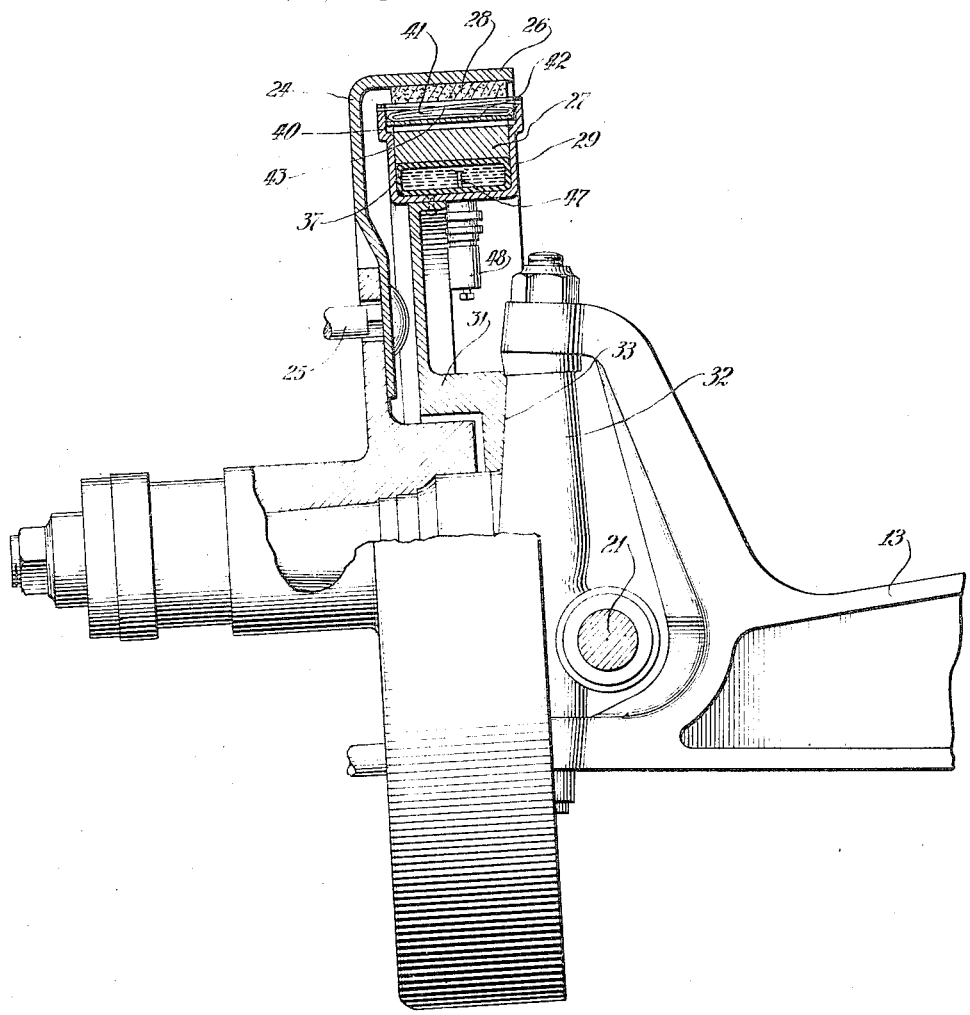
Fig. 2 is a view, partially in section and partially in elevation, of a brake drum at a front wheel.
Figure 3:
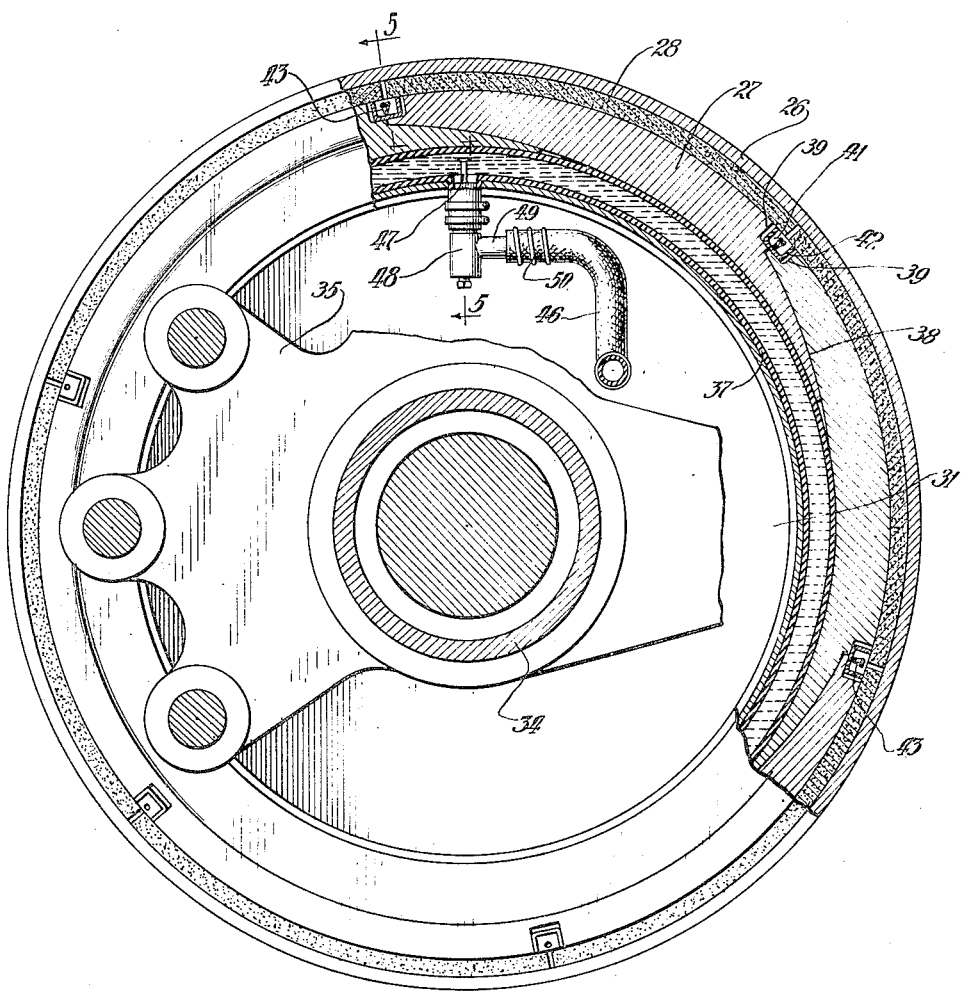
Fig. 3 is a face elevation of a rear wheel drum, certain parts being broken away and others shown in section to better illustrate the construction.
Figure 4:
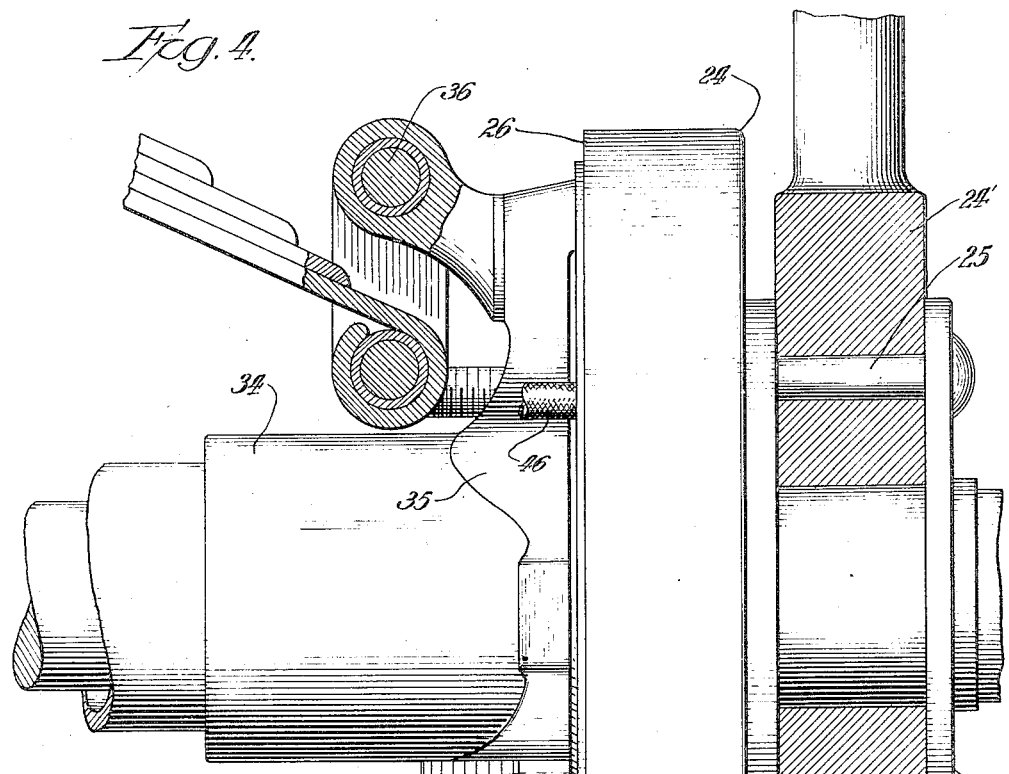
Fig. 4 is an elevational view of said rear wheel drum, showing the manner in which it is mounted and associated with the wheel.

In the present instance, a brake is provided at each of the four wheels, one of the front wheel brakes being shown in Fig. 2 and one of the rear wheel brakes being shown in Figs. 3 and 4, the front and rear wheels being indicated, respectively, by the reference characters 22 and 23 (see Fig. 1). As the brake construction, except for the manner in which the non-rotatable parts of the brakes are supported, is identical at all the wheels, only a single brake need be described in detail, attention being called, in this connection, particularly to Figs. 3 and 5. A drum 24 is secured to the wheel 24' by means of bolts 25, or other suitable fastening devices. Said drum is provided with a circumferential flange 26, adapted to be frictionally engaged by the brake lining of the movable brake parts, as will now be described.

The movable braking element comprises segments 27, of wood or other non-heat-conducting material, which are arranged about the interior of the drum in suitable number and are provided with brake lining 28, which may be of asbestos, or any usual brake lining material. Said segments are disposed for radial movement within a circular channel 29, which is bolted at 30 to a flange 30' upon a fixed support 31. The supports 31 at the front wheels are rigidly secured to the steering knuckle 32, as by welding at 33, and the supports at the rear wheels are mounted upon the axle collars 34 and suspended by means of a web member 35 and suitable studs to the radius or tortion rods 36.

The segments 27 are adapted to be actuated to set and release the brakes by means of an inflatable tube 37 extending continuously around the channel 29 at the bottom thereof and adapted to be inflated by hydraulic pressure in manner which will be presently described. The segments 27 are separate and each movable independently of the others, so that in the event one thereof should, for any reason, fail to function properly, the brakes will nevertheless be set and the system will not fail to operate. The ends of adjacent segments overlie each other in matching relation, as indicated at 38, and are cut away at 39 to form slots 41 in which are disposed channel-shaped cross pieces 42, the ends of which are held in recesses 40 in the channel 29. Springs 43 are looped within said channel-shaped members 42 and have their ends disposed in apertures 44 in the walls of the channel 29, the function of said springs being to hold the segments 27 normally retracted and to move them quickly to release the brakes when the hydraulic pressure is removed.

Figure 5:
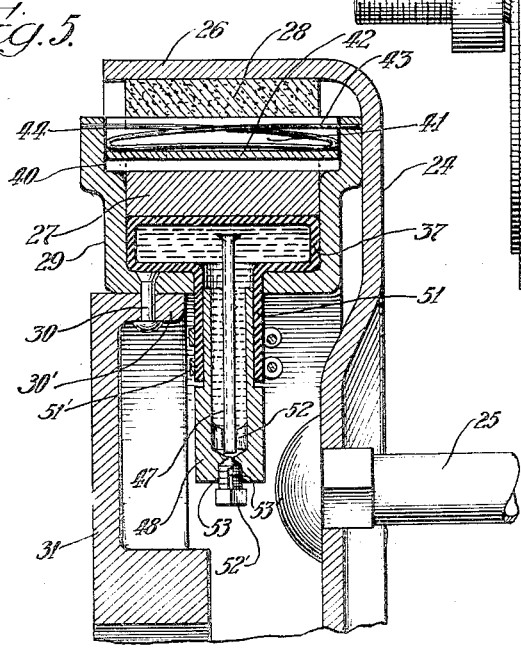
Fig. 5 is an enlarged sectional view, taken substantially upon the section line 5—5 in Fig. 3 and showing the means for admitting fluid to the inflatable tubes, and also the means for exhausting air from the system when it is first installed.

The liquid is admitted through a conduit 46, leading from a source of pressure to be later described, and I employ means illustrated particularly in Fig. 5 for exhausting air from the system when the liquid is first forced through the conduits and into the tubes 37. Said means comprises a small tube 47, extending through an inlet member 48, which is preferably formed of brass and is provided with an extension 49 upon which the flexible hose or conduit 46 is clamped, as indicated at 50. An extension, or nipple, 51 of the tube 37 is clamped upon the upper end of the inlet member 48 by means of clamping rings 51' and the tube 47 is held in centered position by means of inwardly extending flanges 52 within said member, or in any suitable manner. A screw 52' is disposed in an opening 53 and has a slot 53' at one side thereof, the point of said screw being normally disposed in a small opening, provided centrally in the beveled bottom wall in the member 48. It will be apparent that a partial turn of said screw will unseat the conical tip of the screw from the opening which will establish communication between the tube 47 and the slot 53', so that the air may be exhausted, after which the screw 52' is set and thereafter need not be disturbed, inasmuch as the system is sealed against the outside atmosphere.

Figure 9:
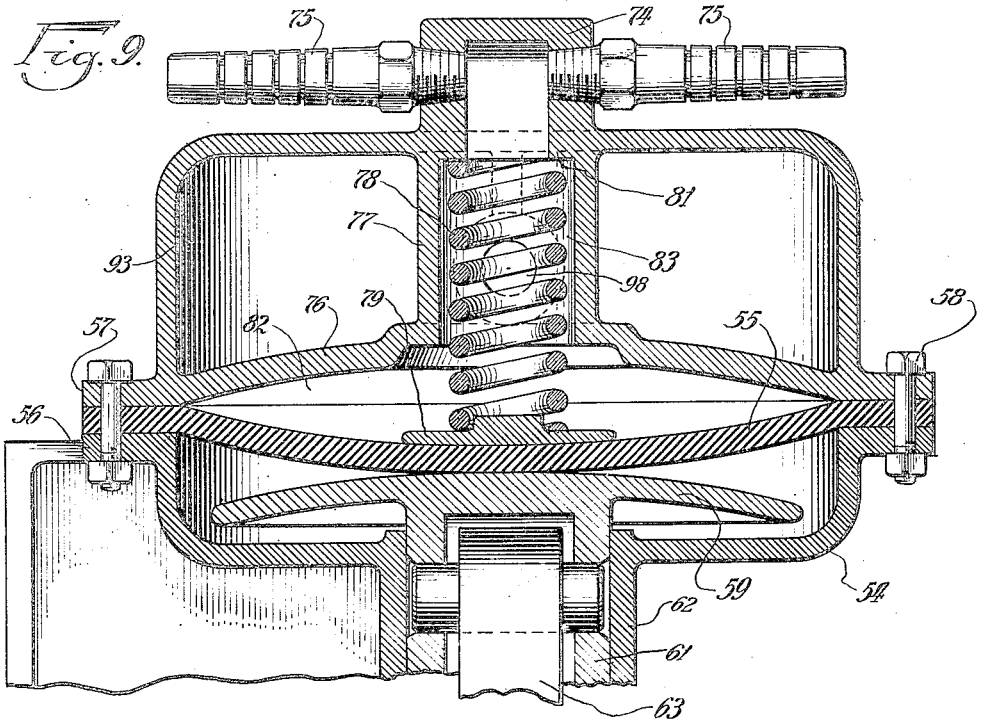
Fig. 9 is a horizontal section of said compressor, being taken substantially on the section line 9—9 in Fig. 7.
Figure 8:
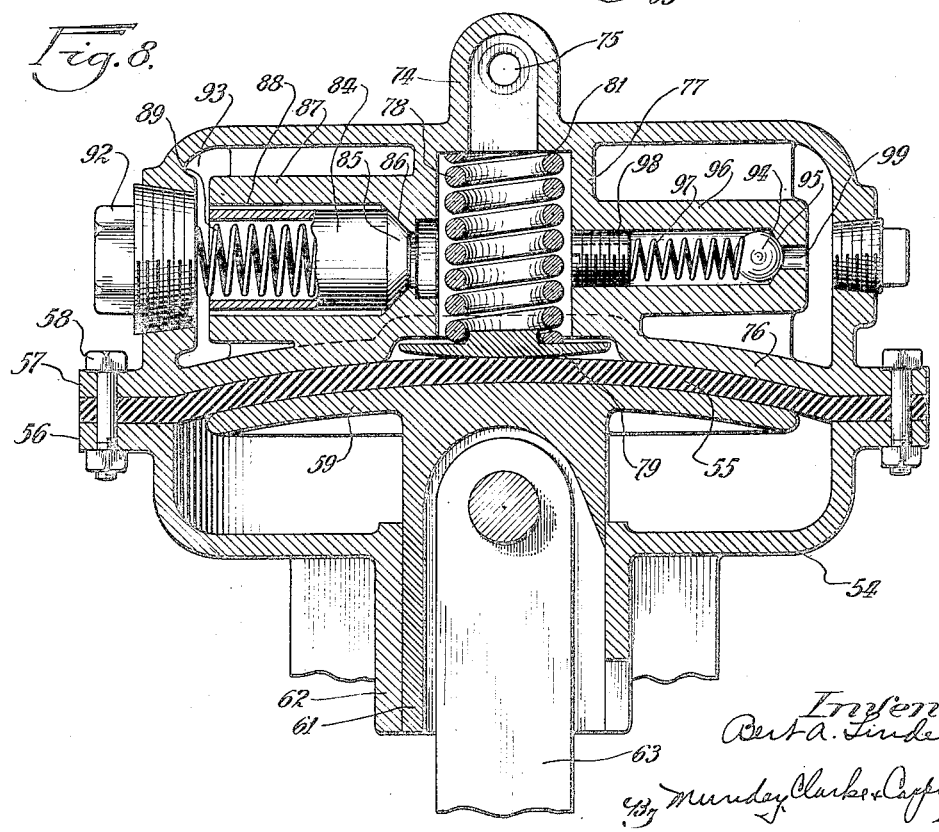
Fig. 8 is a vertical section of said compressor, taken substantially on the section line 8—8 in Fig. 7.
Figure 10:
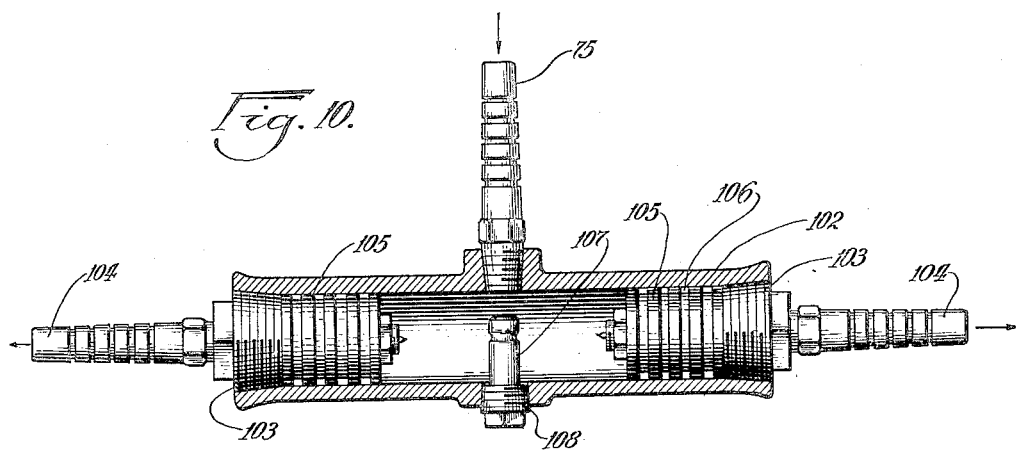
Fig. 10 is a longitudinal sectional view of one of the measuring valves, showing the floating pistons in the position assumed when the brakes are applied.

The mechanism which I employ for placing the liquid under pressure comprises a diaphragm structure, shown clearly in Figs. 8 and 9. Said structure comprises a two-part casing 54, in which is mounted a diaphragm 55, which is firmly clamped at its edge between flanges 56 and 57 formed respectively on the forward and rear sections of the casing, said flanges being held tightly against the diaphragm by means of a plurality of bolts 58. The diaphragm is adapted to be actuated by means of a ram 59, having an extension 61 disposed in a hollow forward extension 62 of the forward section of the casing and being pivotally connected to a link 63, which in turn is pivotally connected at 64 to an arm 65, rigidly secured to a shaft 66, having bearings in hangers 67 depending from the floor 16 of the car, said shaft being adapted to be rocked by means of a foot lever 68, terminating in the foot pedal 17. Said lever 68 is bent upwardly at 69 and extends through a slot 71 in the floor 16 so that it may be actuated by foot pressure applied in the usual manner, a spring 72 being employed to hold said lever normally in the up position, with the brakes released. The casing 54 is supported from the floor by means of brackets 73 and has a hollow rearward projection 74 from the opposite sides of which conduits 75 lead to the brakes.

The rearward section of the casing 54 is provided with a forward concave wall 76 and a cylindrical central part 77, which latter is hollow and has a coil spring 78 mounted therein, the forward end of said spring bearing against a plate 79 engaging and movable with the center of the diaphragm 55. Said spring, at its opposite ends, engages a shoulder 81 on the interior of the casing and it will be evident that said diaphragm 55 is thus normally held in the retracted position shown in Fig. 9. The space 82, between the wall 76 and the diaphragm 55 when the latter is retracted, communicates, through the central passage 83 in the cylindrical part 77, with the braking system, the liquid being drawn into this space when the diaphragm is retracted to release the brakes and being expelled therefrom by rearward movement of said diaphragm to the position shown in Fig. 8 to apply said brakes.

It is contemplated that after the braking system of the invention is installed, it will automatically accommodate itself to changing conditions brought about by wear of the brake lining, or other parts, and that no adjustment of the operating parts, or change in volume of the liquid need be made at any time, the system being hermetically sealed and self-adjusting, so that it requires no attention whatever after it has once been properly installed and filled, other than an occasional filling to maintain the pressure in the system which is gradually reduced by wear of the parts. To this end, I provide a relief valve, shown clearly in Figs. 7 and 8. This valve comprises a hollow member 84, having a beveled end 85 adapted to engage a valve seat 86 provided in a lateral extension 87 of the center spring housing 77. Said extension 87 is provided with a central opening 88, of slightly larger dimension than the diameter of the valve member 84. A spring 89 is positioned within said member 84 and extends into a recess 91 in a filler cap 92. The purpose of this valve is to draw off excess liquid into a supply chamber 93 when a predetermined pressure is obtained at the brakes, it being evident that when the pressure of the brake applying liquid exceeds the tension of the spring 89, the valve member 84 will be unseated and the liquid permitted, to pass through the opening 88, until the pressure in the system becomes equal to, or slightly less than the force of the spring 89, whereupon said valve member is seated and no further escape of liquid is permitted. It will be evident that the strength of the spring 89 is determined by the pressure desired in the system and that when a proper spring is used to exactly equalize the pressure required in the system, any excess pressure will be relieved, in the manner described.

In the event that the brake lining becomes worn, however, it may be necessary to admit more fluid to the system, and for this purpose I provide a check valve, comprising a ball 94, positioned in a valve seat 95 in an extension 96 of the spring housing 77 opposite the extension 87, this valve being held under the tension of the spring 97, bearing at its opposite end against an apertured screw 98, which, as will be apparent, may be positioned by a screw driver extending through the opening normally closed by the filler cap 92. The spring 97 is relatively weak, so that when a deficiency of pressure in the brake applying system occurs, liquid is admitted from the chamber 93, through an opening 99 in said extension 96, the valve 94 being unseated by pressure in the supply chamber in excess of the pressure of the operating fluid which is caused by a deficiency in the volume of the fluid in the system, the pressure of the fluid in the supply chamber being created by pumping a supply of fluid into the chamber 93 through the opening covered by the filler cap 92 which may be done periodically to maintain the fluid pressure in the supply chamber at a desired value.

The liquid flowing out through the conduits 75 passes through measuring valves 101, which are identical at opposite sides of the machine and are illustrated particularly in Figs. 1 and 10 to 12 of the drawings. Each said valve consists of a cylinder 102, closed at its opposite ends by means of apertured screw caps 103, from which conduits 104 lead in opposite directions to the front and rear brakes. Floating pistons 105 are mounted in said cylinder 102 and are formed with circumferential slots 106, said pistons having a relatively loose fit with the cylinder 102 and being adapted to move between the caps 103 and a central stop 107 projecting inwardly from a screw 108 threaded into the wall of the cylinder. Check valves 109, which may be of the well-known "Schroeder" type as shown, or of any preferred form adapted to the purpose, are provided in the pistons 105 and are adapted to permit the liquid to pass outwardly through said pistons when necessary to compensate for wear at the brakes and to prevent return of said liquid after it has passed the piston. The valves, as shown, are screwed into sleeves 110 which, in turn, are screwed into the pistons 105, and the fluid passing through an opening in the fixed part of the valve, indicated at 111, unseats the movable part 112 against the tension of a spring 113, said part 112 being held in sealing relation to the part 111 by pressure exerted in the opposite direction to prevent return of fluid which has already passed. It is desirable that there should always be sufficient liquid in the tubes 37 at the brakes to act as a stop for the receding segments 27 and to limit the movement thereof to a predetermined distance. When, therefore, the brake lining becomes worn, it is desirable to allow enough liquid to pass the pistons 105 to compensate for such wear so that the operating parts will have the same stroke under all conditions. Liquid under pressure having been admitted to the cylinder 102, it first moves the piston 105 outwardly to the position shown in Fig. 10, and if there is a sufficient quantity of liquid in advance of said pistons, the brakes will be applied without any passage of the liquid through the valves 109. If, however, there be a deficiency of pressure in advance of the pistons, as compared to the pressure in the cylinder 102, said valve 109 will open and permit the necessary volume to pass to equalize the pressure on the opposite sides of said piston, the volume in the inflatable tubes 37 being thus automatically regulated under changing conditions.

Figure 11:
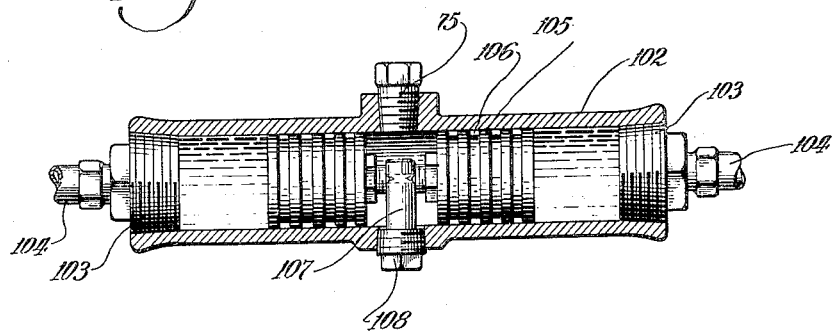
Fig. 11 is a similar view, showing said pistons in the position assumed when the brakes are released.
Figure 12:
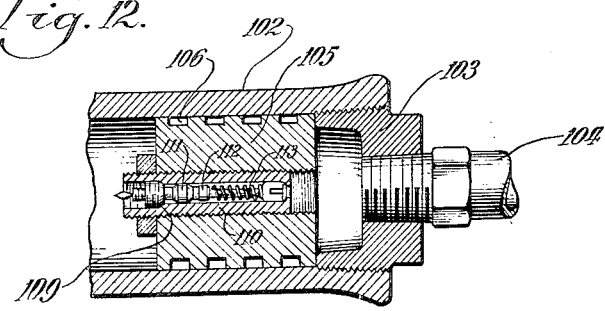
Fig. 12 is an enlarged detail section of one end of said measuring valve, showing the compensating valve carried by said pistons.

When the brakes are released, it is highly desirable that the same amount of liquid be withdrawn from each brake, and this practically instantly, in order to prevent skidding which would be caused if the braking pressure at any of the brakes were not removed simultaneously with the release of the other brakes. The function of the stops 107 is, therefore, to insure that a like amount of liquid will be withdrawn from each of the four brakes, it being evident that after one of the pistons 105 has moved into contact with said stop, as shown in Fig. 11, the suction will be concentrated upon the other pistons and there will not be more liquid withdrawn from one tube 34 than from the others. This is a highly important feature of the invention, since, in practice, it prevents skidding and insures uniformity of action, which would otherwise be impossible.

The circumferential grooves 106 in the pistons 105 serve to collect any grit or foreign substance which might enter the cylinder 102 and prevent their being ground into the metal surfaces.

In the system as described, the operating volume of liquid may be constant under all conditions and a residual quantity is provided to automatically supply any deficiency which might occur at the brakes due to wear, the system being therefore, self-contained and non-adjustable, since it is adapted to automatically accommodate itself to any conditions which might occur.

It is thought that the invention and many of its attendant advantages will be understood from the foregoing description, and it will be apparent that various changes may be made in the form, construction and arrangement of the parts, without departing from the spirit and scope of the invention, or sacrificing all of its material advantages, the form hereinbefore described being merely a preferred embodiment thereof.

I claim:

1. In a fluid operated brake, the combination of a rim member having a perpiheral, channel shaped portion, an inflatable tube lying in the bottom of said channel shaped portion, a series of arcuately shaped segments having their adjacent ends overlying each other in matching relation, said segments concentrically surrounding said tube and lying in said channel shaped member, the junction of the adjacent overlying portions of said segment being cut away to form slots, channel shaped cross pieces lying in said slots transversely of said peripheral channel, springs looped within said channel shaped members and having their ends disposed in apertures in the walls of the peripheral channel, whereby said springs hold said segments normally retracted, and a rim member concentrically surrounding said segments and forming a braking surface.

2. In a fluid pressure operated brake, the combination of a support member, a collapsible, hollow tube mounted thereon, braking means adapted to be shifted by the inflation of said tube to operate the brake, said tube having an inflating nipple extending therefrom and connecting with a source of fluid pressure, and means in said nipple for exhausting the air from said tube when the fluid pressure liquid is first forced into the tube.

3. In a fluid pressure operated brake, the combination of a support member, a collapsible, hollow tube mounted thereon, braking means adapted to be shifted by the inflation of said tube to operate the brake, said tube having an inflating nipple projecting therefrom and connecting to a source of fluid, a relatively small tube mounted within said nipple projecting into said inflatable tube, said relatively small tube having a discharge opening to the atmosphere through the wall of said nipple and a valve for opening and closing said opening.

4. In a fluid pressure operated brake, the combination of a support member, a collapsible, hollow tube mounted thereon, braking means adapted to be shifted by the inflation of said tube to operate the brake, said tube having an inflating nipple projecting therefrom and connecting with a source of fluid, a relatively small tube passing through said nipple and spaced from the walls thereof and terminating adajacent an aperture through the walls of said nipple, and a valve threading into the walls of said aperture to close the same, said valve permitting the discharge of air through said relatively small tube when unscrewed.

5. In a fluid pressure operated brake, the combination of a support member, a collapsible, hollow tube mounted thereon, braking means adapted to be shifted by the inflation of said tube to operate the brake, a metal nipple projecting from said tube and connected with a source of fluid, said nipple having its bottom walls bevelled inwardly, terminating in a bore passing through the wall of said nipple and communicating with the atmosphere, a screw plug threading into said bore, said plug having a slot in one side thereof to permit communication between the atmosphere and the inside of said nipple when said plug is unscrewed and a relatively small tube carried by the inner walls of said nipple and spaced therefrom, said tube extending longitudinally of said nipple and into the main tube to permit the withdrawal of air from said main tube when the liquid is first forced into said main tube.

BERT A. LINDERMAN.